United States Patent [19]
Roche

[11] Patent Number: 5,268,239
[45] Date of Patent: Dec. 7, 1993

[54] FLUOROPOLYMER LAMINATED SEPARATOR PLATE

[75] Inventor: Robert P. Roche, Cheshire, Conn.

[73] Assignee: International Fuel Cells Corporation, South Windsor, Conn.

[21] Appl. No.: 997,440

[22] Filed: Dec. 28, 1992

[51] Int. Cl.⁵ .................. H01M 2/16; H01M 8/04
[52] U.S. Cl. ........................ 429/18; 429/35; 429/144; 429/249
[58] Field of Search ............... 429/34, 18, 35, 253, 429/248, 247, 249, 144, 142

[56] References Cited

U.S. PATENT DOCUMENTS

| | | | |
|---|---|---|---|
| 4,301,222 | 11/1981 | Emanuelson et al. | 429/251 |
| 4,360,485 | 11/1982 | Emanuelson et al. | 264/29.5 |
| 4,526,924 | 7/1985 | Korb et al. | 524/541 |
| 4,550,015 | 10/1985 | Korb et al. | 423/445 |
| 4,611,396 | 9/1986 | Joo' et al. | 29/623.5 |
| 4,624,811 | 11/1986 | Waikus et al. | 264/29.5 |
| 4,627,944 | 12/1986 | Murakami et al. | 264/29.4 |
| 4,668,496 | 5/1987 | Korb et al. | 423/445 |
| 4,737,421 | 4/1988 | Uemura et al. | 429/34 |
| 4,978,591 | 12/1990 | Wright | 429/35 |
| 5,096,786 | 3/1992 | Granata, Jr. et al. | 429/35 |

Primary Examiner—Anthony Skapars
Attorney, Agent, or Firm—Pamela J. Curbelo

[57] ABSTRACT

Electrolyte migrates inter-cell in fuel cell stacks due to an electric potential gradient across the stack. This migration can be substantially inhibited with a graphite separator plate which has been laminated to the electrolyte reservoir plates of adjacent fuel cells with a fluoropolymer resin. In such an arrangement, the fluoropolymer resin forms an electrolyte barrier between the graphite separator plate while maintaining an electrically conductive pathway between the electrolyte reservoir plate and the graphite separator plate.

9 Claims, 1 Drawing Sheet

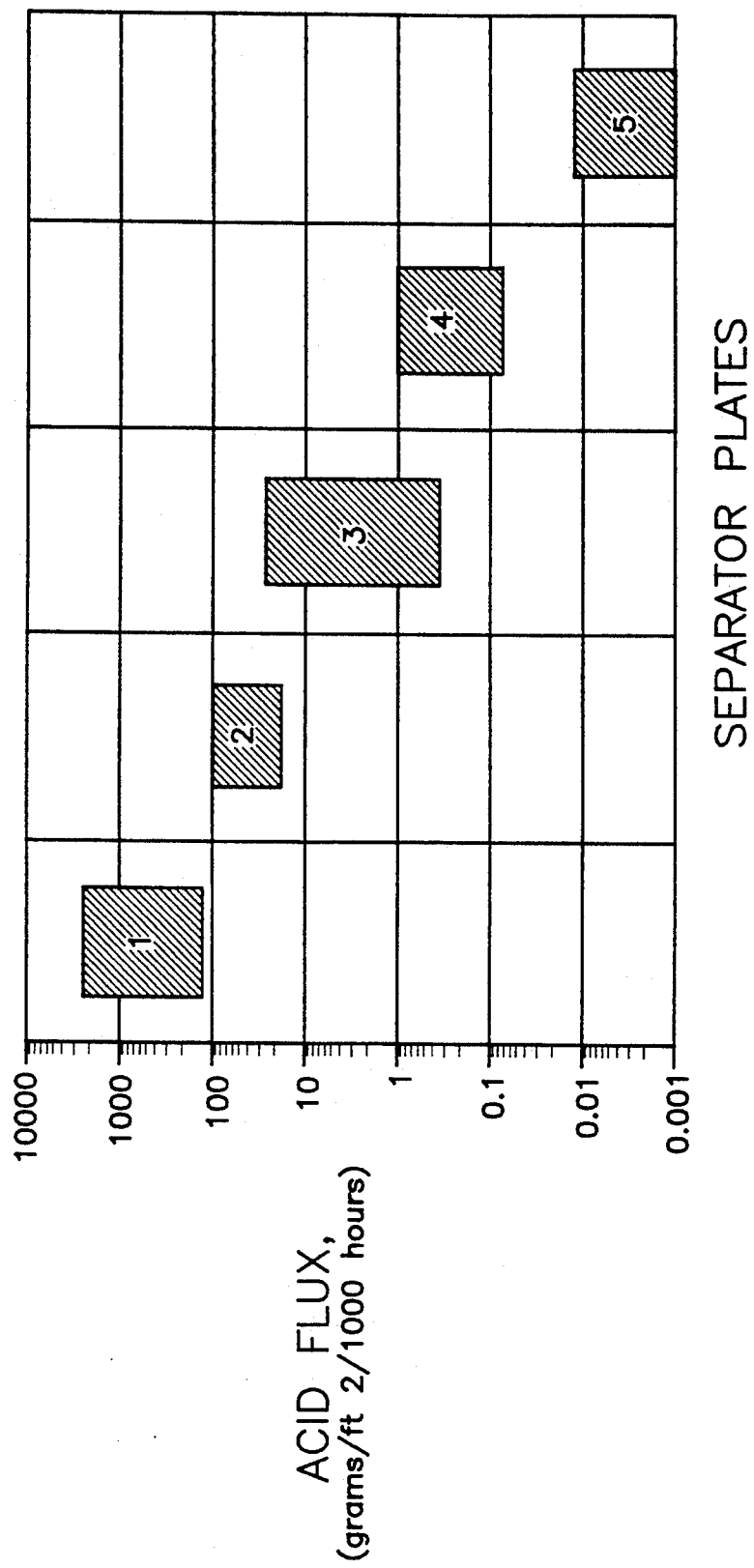

FLUOROPOLYMER LAMINATED SEPARATOR PLATE

TECHNICAL FIELD

The present invention relates to a separator plate and especially relates to an acid impervious separator plate for use in fuel cell and electrolysis cell stacks.

BACKGROUND OF THE INVENTION

Fuel cell stacks, which are composed of individual fuel cells aligned electrically in series, produce electricity via an electrochemical reaction between hydrogen and oxygen. Within each fuel cell, the hydrogen contacts an anode catalyst where it is converted to hydrogen ions and free electrons. The hydrogen ions migrate across an electrolyte to a cathode catalyst where they react with oxygen and the free electrons which have passed through an external load, thereby producing electricity and forming water.

During phosphoric acid fuel cell stack operation, for example, electrolyte migrates both intra-cell and inter-cell due to an electrical potential gradient across individual cells and across the cell stack, thereby decreasing the volume of electrolyte in one area of the fuel cell while increasing it in another. Not only does the electrolyte migrate from the cathode side electrolyte reservoir plate within one cell of a stack to the anode of that cell, it may also migrate across the separator plate to the next cell of the stack. This intra-cell migration can cause electrolyte flooding of the anode, thereby reducing the anode performance and the cell efficiency, while inter-cell migration can cause electrolyte flooding of end fuel cells in a fuel cell substack (approximately 8 fuel cells which are typically part of a larger cell stack), thereby reducing performance of the stack and stack efficiency.

Prevention of electrolyte migration has been addressed in various fashions including the utilization of a graphite separator plate (see U.S. Pat. Nos. 4,360,485 and 4,301,222), a fluoropolymer barrier, and a separator plate comprised of a graphite-fluoropolymer mixture. Since individual fuel cells are typically stacked such that the first and last component of the stack is a porous graphite electrolyte reservoir plate and/or porous graphite cooler holder (herein after referred to as porous component), the migration prevention devices are located between individual cells, adjacent to the porous components of these cells.

These conventional migration prevention devices were only partially successful. The graphite separator plate was meant to block inter-cell electrolyte migration. However, due to the graphite separator plate's porosity of up to about 25%, the plate functioned as and electrolyte absorber. Electrolyte which passed from the porous component was absorbed into the plate, thereby preventing the electrolyte from migrating to the next cell of the stack. However, once the absorption capacity of the plate had been attained, typically after about 28,000 hours of fuel cell operation and occasionally after only about 3,000 hours, the plate no longer inhibited migration.

Unlike the graphite separator plate, the fluoropolymer barrier did function as a blockade to electrolyte migration because it was substantially solid. However, after about 500 hours of fuel cell operation, this barrier significantly degraded due to the difference in the coefficient of thermal expansion of the fluoropolymer and the graphite of the porous component, about $75 \times 10^{-6}$ ppm/°F. versus 1 ppm/°F., respectfully. Thermal cycling of the fuel cell caused the fluoropolymer barrier to pull away from the porous component, thereby forming pathways which allowed a relatively large amount of electrolyte migration, typically about 150 to about 2,500 g/ft$^2$/1,000 hrs. (grams per square foot per 1,000 hours).

Finally, the graphite-fluoropolymer mixture functioned similar to both the graphite plate and the fluoropolymer barrier since the porosity of the plate was reduced with fluoropolymer which blocked the passage of the electrolyte which entered the plate. This mixture initially prevented electrolyte migration due to its low porosity, about 15%. However, as thermal cycling of the fuel cell caused crevices to form in the mixture, pathways developed which allowed electrolyte migration. Therefore, although the mixture was an improvement over the fluoropolymer barrier since the graphite in the mixture acted as a blockade thereby decreasing electrolyte migration, it still failed to maintain electrolyte migration below about 0.5 g/ft$^2$/1,000 hrs. for the typical life of a fuel cell, about 40,000 hours.

Referring to bars 1–4 of the FIGURE, the graphite separator plate (bars 3 and 4) minimized electrolyte migration to about 0.09 to about 26 g/ft$^2$/1,000 hrs., while the fluoropolymer barrier and the graphite-fluoropolymer mixture experienced electrolyte migration of about 120 to about 2,500 g/ft$^2$/1,000 hrs. (bar 1) and about 20 to about 100 g/ft$^2$/1,000 hrs. (bar 2), respectively. However, in order to attain an acceptable fuel cell current density of about 200 ASF for about 40,000 hours, the electrolyte migration should be below about 0.5 g/ft$^2$/1,000 hrs.

Consequently, what is needed in the art is a separator plate capable of minimizing inter-cell electrolyte migration to below about 0.5 g/ft$^2$/1,000 hrs. (assuming a linear rate) for at least about 40,000 hours of fuel cell operation.

DISCLOSURE OF THE INVENTION

The present invention relates to an improved separator plate for inhibiting inter-cell electrolyte migration. This separator plate comprises at least one porous component and a graphite plate with an electrically conductive pathway between the porous component and the graphite plate, and at least one fluoropolymer film which forms an electrolyte barrier between the graphite plate and the porous component.

The present invention further relates to an improved fuel cell stack. This fuel cell stack has a plurality of fuel cells with an anode, a cathode, an electrolyte disposed therebetween, an anode chamber, a cathode chamber and a porous component. The improvement comprises a graphite plate laminated to the porous component of the first fuel cell with a first fluoropolymer film such that an electrically conductive pathway exists between the porous component and the graphite plate, and the fluoropolymer film forms an electrolyte barrier therebetween.

The foregoing and other features and advantages of the present invention will become more apparent from the following description and accompanying drawing.

BRIEF DESCRIPTION OF THE DRAWING

The FIGURE is a bar graph of the typical electrolyte migration for the separator plate of the present invention and for prior art separator means which have been aged in a fuel cell simulated environment at 400° F. and 100 wt % phosphoric acid at 1 atm. air, for about 4,000 to 6,000 hours at high voltages, about 0.90 volts/cell.

This FIGURE is meant to be exemplary and to further illustrate the present invention, and not to limit the scope of the present invention.

BEST MODE FOR CARRYING OUT THE INVENTION

The fuel cell stack of the present invention comprises a graphite plate located between porous components of adjacent fuel cells, with the improvement being a fluoropolymer film on at least one side of the graphite plate. This film forms an electrolyte barrier between the porous component and the graphite plate thereby inhibiting the flow of electrolyte from the porous component to the graphite plate, and if located on both sides of the graphite plate, flow of electrolyte from the graphite plate to the porous component of the next cell.

The graphite plate is a mixture of about 25 weight percent (wt %) to about 75 wt % graphite and about 25 wt % to about 75 wt % resin, with about 40 wt % to about 60 wt % graphite and about 40 wt % to about 60 wt % resin preferred, and about 45 wt % to about 55 wt % graphite and about 45 wt % to about 55 wt % resin especially preferred. The graphite is preferably in the form of powder having particle sizes of about $5\mu$ (microns) to about $120\mu$, with a particle size of about $45\mu$ to about $55\mu$ preferred due to the ability to obtain substantially homogenous graphite-resin mixtures and favorable low porosities with these particle sizes. As the porosity of the graphite plate decreases, the availability of pathways for the electrolyte to migrate through the graphite plate similarly decreases. Typically, the porosity of this graphite plate is up to about 25%, with below about 20% preferred, and below about 17% especially preferred.

Typically, the resin is a single stage or a two stage phenolic resin which, upon pyrolysis, yields a glassy carbon residue, commonly known as the carbon yield. As the phenolic resin is pyrolyzed, its weight and volume decrease, thereby forming pores in the graphite plate. Consequently, phenolic resins which maintain about 50 wt % (weight percent) or greater of their pre-pyrolysis weight are preferred. Possible phenolic resins include, but are not limited to: #29-217 Phenolic Resin produced by Occidental Chemical Corporation, Durez Division, North Tonawanda, N.Y.; Phenolic Resin #12106 produced by Plastics Engineering Company, Sheboygan, Wis.; Phenolic Resin #PSR133 produced by Lewcott Corporation, Millbury, Mass.; mixtures thereof, and others commonly known in the art.

The graphite and resin are blended to form a substantially homogenous mixture. The mixture is formed into a flat plate having a substantially uniform thickness. The plate is pyrolyzed at temperatures of about 800° C. (about 1470° F.) to about 1,000° C. (about 1830° F.) and then cooled to ambient temperatures (typically about 20° C. (68° F.) to about 30° C. (86° F.)). Following pyrolyzation, the pyrolyzed mixture is graphitized at about 2,300° C. (4,172° F.) to about 3,000° C. (5,432° F.), to fully graphitize the resin. If the resin is only partially graphitized, it is susceptible to both acid and electrochemical attack. Slight pressure can be applied to the graphite plate, up to about 5 psig, to ensure the plate will remain flat during processing. The resulting plate is about 0.015 inches to about 0.05 inches thick, having a pore size distribution of about $0.0001\mu$ to about $0.020\mu$ and a porosity of about 15% to about 25%.

Once fully graphitized, the plate is stacked, conventionally known as laid-up, to laminate the fluoropolymer film to the graphite plate and the porous component. The lay-up sequence is: porous component, fluoropolymer film, graphite plate, fluoropolymer film, porous component. After the lay-up is complete, the fluoropolymer film bonds the porous component to the graphite plate and forms a barrier to electrolyte flow from the porous component to the graphite plate while allowing an electrically conductive pathway to be formed between the porous component and the graphite plate. This lamination is accomplished by applying heat and pressure to the lay-up for about 5 minutes to about 60 minutes. Temperatures of about 280° C. (about 550° F.) to about 345° C. (about 650° F.) and pressures of about 50 psig to about 600 psig can be employed during the lamination process, with temperatures of about 305° C. (about 580° F.) to about 330° C. (about 620° F.) and pressures of about 200 psig to about 400 psig preferred. Higher pressures improve the rate of fluoropolymer flow into the porous component, with the upper limit constrained by the compression characteristics of the porous plate. With respect to temperature, increasing temperature decreases fluoropolymer viscosity, thereby improving flow. However, temperatures above about 330° C. degrade the fluoropolymer film causing individual monomer units to break off from the film and block unintended regions of the porous component, thereby reducing the porous plate's usefulness as an electrolyte reservoir.

Essentially, during lamination, the fluoropolymer flows into the porous component, thereby forming a fluoropolymer barrier to electrolyte migration. Only a small portion of the fluoropolymer film conforms to the surface topography of the graphite plate, due to the larger mean pore size of the porous component than the graphite plate. Typically about 0.01 inches to about 0.02 inches of the porous component adjacent to the fluoropolymer film becomes filled with the fluoropolymer.

The fluoropolymer barrier inhibits electrolyte from passing from the porous component to the graphite plate. Consequently, the fluoropolymer barrier is sufficiently thick such that during fuel cell operation the barrier sufficiently inhibits the electrolyte flow to the graphite plate, thereby maintaining the electrolyte migration through the graphite plate to below about 0.5 $g/ft^2/1,000$ hrs. for about 40,000 hours or greater, depending upon the required life of the fuel cell stack. If less or greater life hours are required, the film thickness can be varied accordingly. The upper limit of the barrier thickness is dependent upon the thickness at which the barrier will interfere with the porous component's function. Therefore, the barrier also preferably has a substantially uniform thickness to ensure maximum protection of the plate without interfering with the porous plates ability to store electrolyte. Typically, the fluoropolymer fills less than about 35% of the porous plate's volume, with about 5% to about 30% of the porous volume filled with fluoropolymer preferred. This film can have a thickness up to about 0.03 inches and typically has a thickness up to about 0.01 inches, with a thickness of about 0.002 inches to about 0.005 inches preferred before lamination. These film thicknesses correspond to barrier thicknesses equivalent to about three times the film thickness. Consequently, the barrier thickness typically ranges from about 0.006 inches to about 0.015 inches. Barrier thicknesses below about 0.005 inches fail to improve the plate's ability to prevent inter-cell electrolyte migration, while thicknesses above about 0.05 inches can interfere with the porous volume.

In addition to having sufficient thickness, the fluoropolymer barrier is continuous while allowing electrical contact between the porous component and the graphite plate. With the fluoropolymer film being substantially continuous, electrolyte cannot pass around the barrier or through the barrier since there are no holes. Therefore, a continuous (single sheet which covers substantially all of the porous component and graphite plate) fluoropolymer film is heated and pressurized to form the electrolyte barrier. As the film flows into the porous component and conforms to the topography of the graphite plate, graphite to graphite contact between the graphite plate and the porous component is attained, thereby forming an electrically conductive pathway from the porous component through the graphite plate to the next porous component. Essentially, due to the topography of the porous component and the graphite plate, graphite valleys and plateaus exist on the surface of both the graphite plate and porous component (on a micro scale). When the lay-up is pressurized and heated, the film flows into the valleys of the graphite plate and into the pores of the porous component, and where two plateaus meet, they puncture the film attaining direct contact and an electrically conductive pathway without forming an electrolyte flow pathway. Consequently, with regard to electrolyte and electrolyte flow, the film and therefore the barrier is continuous. Typically, the electrical resistance between the porous component and the graphite plate is less than about 4 mV/100 ASF (millivolts per (100 amperes per square foot)), and preferably about 1 mV/100 ASF to about 2 mV/100 ASF or lower.

In order to ensure maintenance of the electrically conductive pathway after lamination of the lay-up described above, it is preferred to cool the lay-up to ambient temperature, under pressure. Although applicants do not want to be bound by theory, it is believed that, due to the coefficient of thermal expansion of the film, if the lay-up is not cooled under pressure, the film will expand out of the porous component, separate the porous component and the graphite plate, and eliminate the graphite to graphite contact which forms the electrically conductive pathway.

The fluoropolymer film can be any resin which withstands the fuel cell environment and can be melt processed. These resins include, but are not limited to: FEP (fluorinated ethylene-polypropylene resin), PFA (a copolymer of tetrafluoroethylene and perfluorinated vinyl ether), mixtures thereof, and others. These films are produced by Du Pont de Nemours, E. I., Co., Wilmington, Del. as types of TEFLON ®, and by others.

The present invention will be further exemplified in the following illustrative example. This example is meant to be exemplary and not to limit the scope of the present invention.

EXAMPLE

The following example has been used to form a laminated graphite separator plate having a FEP Grade 500A TEFLON ®500A film. The graphite plate was laid-up in the following component sequence: electrolyte reservoir plate, 0.127 mm (0.005 inches) thick TEFLON 500A film, 0.9 mm (0.035 inches) thick graphite plate having a porosity of about 15%–17%, 0.127 mm (0.005 inches) thick TEFLON 500A film, and electrolyte reservoir plate, with all components having both a length and a width of 32.75 inches by 32.75 inches. Once laid-up, the assembly was placed in a 500 ton, electrically heated press with 48 inch by 48 inch platens. Cycle times and temperatures for the lamination were: 580° F. under 200 psig pressure for 5 minutes, heat up to 620° .F under 400 psig for 3 minutes, and hold at 620° F. under 400 psig for 10 minutes. Once laminated, the lay-up was cooled down to about ambient temperature under about 400 psig; about 8 minutes. The electrical conductivity measurement, taken in the thru-plane direction, was 1.3 mV/100 ASF current density. The laminated lay-up was cut to 6 inches by 6 inches and the cut-outs were aged in a fuel cell simulated environment (400° F., 100 wt % phosphoric acid at 1 atm (atmosphere) air and 0.90 volts) for up to 6,000 hours. The electrolyte migration was about 0.01 grams/ft$^2$/1,000 hours.

The unique separator plate of the present invention is capable of significantly inhibiting inter-cell electrolyte migration. The prior art separator plates were only capable of reducing electrolyte migration to about 0.09 to about 1.0 g/ft$^2$/1,000 hrs. (see the FIGURE, bar 4, while the present invention reduces electrolyte migration to below about 0.012 g/ft$^2$/1,000 hrs. (bar 5). Consequently, it is believed that a fuel cell stack incorporating the present invention can operate for the 40,000 hour design life while maintaining a current density above about 200 amps/ft$^2$ and an inter-cell electrolyte migration below about 0.05 g/ft$^2$/1,000 hrs.

The separator plate of the present invention is a combination of fluoropolymer film and a graphite plate which when laminated to the fuel cell porous component creates an overall separator plate capable of enduring the 40,000 hour phosphoric acid fuel cell environment at about 200 amps/ft$^2$ to about 400 amps/ft$^2$.

Although the present invention has been shown and described with respect to detailed embodiments thereof, it will be understood by those skilled in the art that various changes in form and detail thereof may be made without departing from the spirit and scope of the claimed invention.

I claim:

1. An improved separator plate for inhibiting inter-cell electrolyte migration, which comprises:
    a. at least one porous component;
    at least one fluoropolymer film; and
    c. a graphite plate laminated to said porous component with said film, wherein an electrically conductive pathway exists between said porous component and said graphite plate;
    whereby said film forms an electrolyte barrier between said graphite plate and said porous component.

2. An improved separator plate as in claim 1, wherein said porous component is an electrolyte reservoir plate or a graphite cooler holder.

3. An improved separator plate as in claim 1, wherein said fluoropolymer film is fluorinated ethylene-polypropylene resin, a copolymer of tetrafluoroethylene, or mixtures thereof.

4. An improved fuel cell stack having a plurality of fuel cells each having an anode, a cathode, an electrolyte disposed therebetween, an anode chamber, a cathode chamber, and a porous component, wherein said improvement comprises: a graphite plate laminated to the porous component of the first fuel cell with a first fluoropolymer film such that said fluoropolymer film forms an electrolyte barrier, and wherein an electrically conductive pathway exists between said porous component and said graphite plate.

5. An improved fuel cell stack as in claim 4 further comprising said graphite plate laminated to a second porous component of the second fuel cell with a second fluoropolymer film, wherein said second fluoropolymer film forms a second electrolyte barrier, and an electrically conductive pathway exists between said second porous component and said graphite plate such that electricity can flow from said first porous component through said graphite plate to said second porous component.

6. An improved fuel cell stack as in claim 4, wherein said porous component is an electrolyte reservoir plate or a graphite cooler holder.

7. An improved fuel cell stack as in claim 4, wherein said fluoropolymer film is fluorinated ethylene-polypropylene resin, a copolymer of tetrafluoroethylene, or mixtures thereof.

8. An improved fuel cell stack as in claim 5, wherein said porous component is an electrolyte reservoir plate or a graphite cooler holder.

9. An improved fuel cell stack as in claim 5, wherein said fluoropolymer film is fluorinated ethylene-polypropylene resin, a copolymer of tetrafluoroethylene, or mixtures thereof.

* * * * *